(12) United States Patent
Zhu et al.

(10) Patent No.: US 8,600,818 B2
(45) Date of Patent: Dec. 3, 2013

(54) METHOD, DEVICE, AND SYSTEM FOR CARRYING POINT OF SALE DATA SERVICE OVER INTERNET PROTOCOL NETWORK

(75) Inventors: Weiping Zhu, Haryana (IN); Hong Ye, Shenzhen (CN); Qiuming Peng, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 161 days.

(21) Appl. No.: 13/105,721

(22) Filed: May 11, 2011

(65) Prior Publication Data

US 2011/0276421 A1 Nov. 10, 2011

Related U.S. Application Data

(63) Continuation of application No. PCT/CN2009/074635, filed on Oct. 27, 2009.

(30) Foreign Application Priority Data

Nov. 11, 2008 (CN) .......................... 2008 1 0172735

(51) Int. Cl.
*G06Q 20/00* (2012.01)
*H04L 12/66* (2006.01)

(52) U.S. Cl.
USPC ............................................. 705/21; 370/352

(58) Field of Classification Search
USPC ..................................... 370/254–352; 705/21
See application file for complete search history.

(56) References Cited

U.S. PATENT DOCUMENTS 7,864,710 B2 * 1/2011 Wang ............................ 370/255
2007/0291734 A1 * 12/2007 Bhatia et al. .................. 370/352

FOREIGN PATENT DOCUMENTS

| CN | 1622581 A | 6/2005 |
|---|---|---|
| CN | 1848801 A | 10/2006 |
| CN | 1882032 A | 12/2006 |
| CN | 101018216 A | 8/2007 |
| WO | WO 01/91371 A2 | 11/2001 |
| WO | WO 2007/062418 A2 | 5/2007 |
| WO | WO 2010/054577 A1 | 5/2010 |

OTHER PUBLICATIONS

Surf, "V.150 Modem over IP White Paper," Surf Communications Solutions, www.surf-com.com, 2005, 10 pages.

(Continued)

*Primary Examiner* — Ayaz Sheikh
*Assistant Examiner* — Debebe Asefa
(74) *Attorney, Agent, or Firm* — Slater & Matsil, L.L.P.

(57) ABSTRACT

A method, device, and system for carrying a Point of Sale (POS) data service over an IP network are disclosed. A method for carrying a POS data service over an IP network includes receiving, by a home gateway, a number dialed by a user at a POS. When determining that the number dialed at the POS is a POS access code according to configuration information, a call link with a softswitch is set up through Session Initiation Protocol (SIP) signaling interactions and Session Description Protocol (SDP) negotiation is performed with the softswitch. A DSP inside the home gateway is switched from a normal voice mode to a POS data service mode. POS negotiation is performed with a Network Access Server (NAS) connected to a banking center and data services exchanged between the POS and the banking center are transferred after successful negotiation.

18 Claims, 6 Drawing Sheets

(56) References Cited

OTHER PUBLICATIONS

Cisco, "Communications Transformations: Implementation Considerations when Enhancing Enterprise Communications Solutions with SIP Trunks," White Paper, Cisco Systems, Inc. 2007, 19 pages.

Written Opinion of the International Searching Authority, International Application No. PCT/CN2009/074635, Applicant: Shenzhen Huawei Communication Technologies Co., Ltd., et al. Dated: Feb. 4, 2010, 3 pages.

Extended European Search Report, European Application No. 09825752.0-2414/2352268, Applicant: Huawei Device Co., Ltd., Dated: Aug. 19, 2011, 10 pages.

Second Chinese Office Action and Partial Translation received in Chinese Patent Application No. 200810172735.7, mailed Jul. 20, 2012, 8 pages.

First Chinese Office Action, Chinese Application No. 200810172735.7, Dated: Sep. 23, 2011, 13 pages.

\* cited by examiner

METHOD, DEVICE, AND SYSTEM FOR CARRYING POINT OF SALE DATA SERVICE OVER INTERNET PROTOCOL NETWORK

This application is a continuation of International Application No. PCT/CN2009/074635, filed on Oct. 27, 2009, which claims priority to Chinese Patent Application No. 200810172735.7, filed on Nov. 11, 2008, both of which are hereby incorporated by reference in their entireties.

TECHNICAL FIELD

The present invention relates to network technologies, and in particular, to a method, device, and system for carrying a Point of Sale (POS) data service over an Internet Protocol (IP) network.

BACKGROUND

With the fast popularity of IP networks, Voice over IP (VoIP) is widely used and the POS over VoIP is widely deployed. Accompanying this is a new style of consumption through card swiping on a POS connected to a Plain Old Telephone Service (POTS) port of a home gateway. The new style of payment is now accepted almost everywhere by households, shopping malls, hospitals, and other organizations. Payment through POS requires a prompt and reliable connection with a remote banking center. To enable a POS application over an IP network, a Digital Signal Processor (DSP) of a gateway must be used to detect the answer tone sent by the remote end through Real-time Transport Protocol (RTP) packets, and then the DSP is switched from the normal voice service mode to the POS data service mode.

During the implementation of the present invention, the inventor finds that the prior art has at least the following problems.

First, delays are unavoidable in an IP network. A delay exists when the gateway receives the answer tone carried in RTP packets form the remote end, as a result, a delay also exists when the DSP is switched to the POS data service mode upon detection of the answer tone. Therefore, a prompt connection between the POS and the remote banking center cannot be assured and fast payment through card swiping is impossible.

Second, because packet loss and jitter are unavoidable in an IP network, an error may occur when the DSP detects the answer tone from the remote end, and even worse, the DSP may fail to switch to the POS data service mode. As a result, a connection cannot be set up between the POS and the remote banking center and consequently, the payment through card swiping is unsuccessful.

SUMMARY OF THE INVENTION

Embodiments of the present invention provide a method, device, and system for carrying a POS data service over an IP network so as to assure a prompt and reliable connection between a POS and a remote banking center.

A method for carrying a POS data service over an IP network includes receiving, by a home gateway, a number dialed by a user at a POS. When determining that the number dialed at the POS is a POS access code according to configuration information, a call link with a softswitch is set up through Session Initiation Protocol (SIP) signaling interactions and Session Description Protocol (SDP) negotiation is performed with the softswitch. A DSP inside the home gateway is switched from a normal voice mode to a POS data service mode. POS negotiation is performed with a Network Access Server (NAS) connected to a banking center and data services exchanged between the POS and the banking center are transferred after successful negotiation.

A home gateway includes a DSP and further includes a number receiving unit, that is configured to receive a number dialed by a user at a POS. An SDP negotiating unit is configured to set up a call link with a softswitch through SIP signaling interactions and to perform SDP negotiation with the softswitch when determining that the number dialed at the POS is a POS access code according to configuration information. A switching unit is configured to switch the DSP from a normal voice mode to a POS data service mode. A POS negotiating unit is configured to perform POS negotiation with a NAS that is connected to a banking center. A service transferring unit is configured to transfer data services exchanged between the POS and the banking center after successful POS negotiation of the POS negotiating unit.

A softswitch includes a call receiving unit that is configured to receive a call initiated by a home gateway via SIP signaling, an SDP message of which carries an X-pos field indicating negotiation of switching to a POS data service mode. A negotiating unit is configured to perform SDP negotiation with the home gateway according to the X-pos field. An instructing unit is configured to instruct the home gateway and a Universal Media Gateway (UMG) to switch to the POS data service mode.

A UMG includes a DSP and further includes an instruction receiving unit that is configured to receive an instruction of switching to a POS data service mode from a softswitch. A switching unit is configured to switch the DSP from a normal voice mode to the POS data service mode according to the instruction received by the instruction receiving unit.

A system for carrying a POS data service over an IP network includes a home gateway, a softswitch, a UMG, and a NAS that are connected in sequence. The NAS is connected to a banking center.

The home gateway is configured to receive a number dialed by a user at a POS, and when determining that the number dialed at the POS is a POS access code according to configuration information, set up a call link with the softswitch through SIP signaling interactions and perform SDP negotiation with the softswitch, and switch its DSP from a normal voice mode to a POS data service mode; and configured to perform POS negotiation with the NAS, and after successful negotiation, transfer data services exchanged between the POS and the banking center via the UMG and the NAS. In the method, device, and system for carrying a POS data service over an IP network, the DSP of a gateway no longer needs to switch its mode according to an unreliable answer tone from the remote end, as in the prior art, but quickly and accurately switches to the POS data service mode to facilitate POS negotiation, training, and learning and guarantee a prompt and reliable connection between the POS and the remote banking center.

BRIEF DESCRIPTION OF THE DRAWINGS

To better explain the technical solution of the present invention, the accompanying drawings required in the description of the embodiments of the present invention will be briefly described. It is apparent that the accompanying drawings illustrate only some exemplary embodiments of the present invention. Those skilled in the art can derive other drawings from these drawings without any creative effort.

DETAILED DESCRIPTION OF ILLUSTRATIVE EMBODIMENTS

To better explain the technical solution of the present invention, the embodiments of the present invention will be described in detail with reference to the accompanying drawings. It is apparent that the embodiments herein are only some exemplary embodiments of the present invention. Based on the embodiments herein, those skilled in the art can derive other embodiments without inventive effort and such other embodiments all fall into the scope of the present invention.

To help those skilled in the art better understand the technical solution of the present invention, the embodiments of the present invention will be described in detail with reference to the accompanying drawings.

A method for carrying a POS data service over an IP network according to an embodiment of the present invention include: by a home gateway, receiving a number dialed at a POS upon card swiping or other user operations; when determining that the number dialed at the POS is a POS access code according to configuration information, performing SIP signaling with a softswitch to set up a call link, and performing SDP negotiation with the softswitch; switching a DSP inside the home gateway from the normal voice mode to the POS data service mode; performing POS negotiation with a NAS connected to a banking center and transferring data services exchanged between the POS and the banking center after successful negotiation. In the embodiment of the present invention, when a card is swiped at the POS, the home gateway receives a number reported by the POS, and once determining that the number reported by the POS is a POS access code according to the configuration information, switches its DSP to the POS data service mode. Thus, the DSP of the home gateway no longer needs to switch its service mode according to an unreliable answer tone from the remote end, but quickly and accurately switches to the POS data service mode. This facilitates POS negotiation, training, and learning, and assures a prompt and reliable connection between the POS and the remote banking center, so that the success rate of card swiping is increased.

Figure 1:
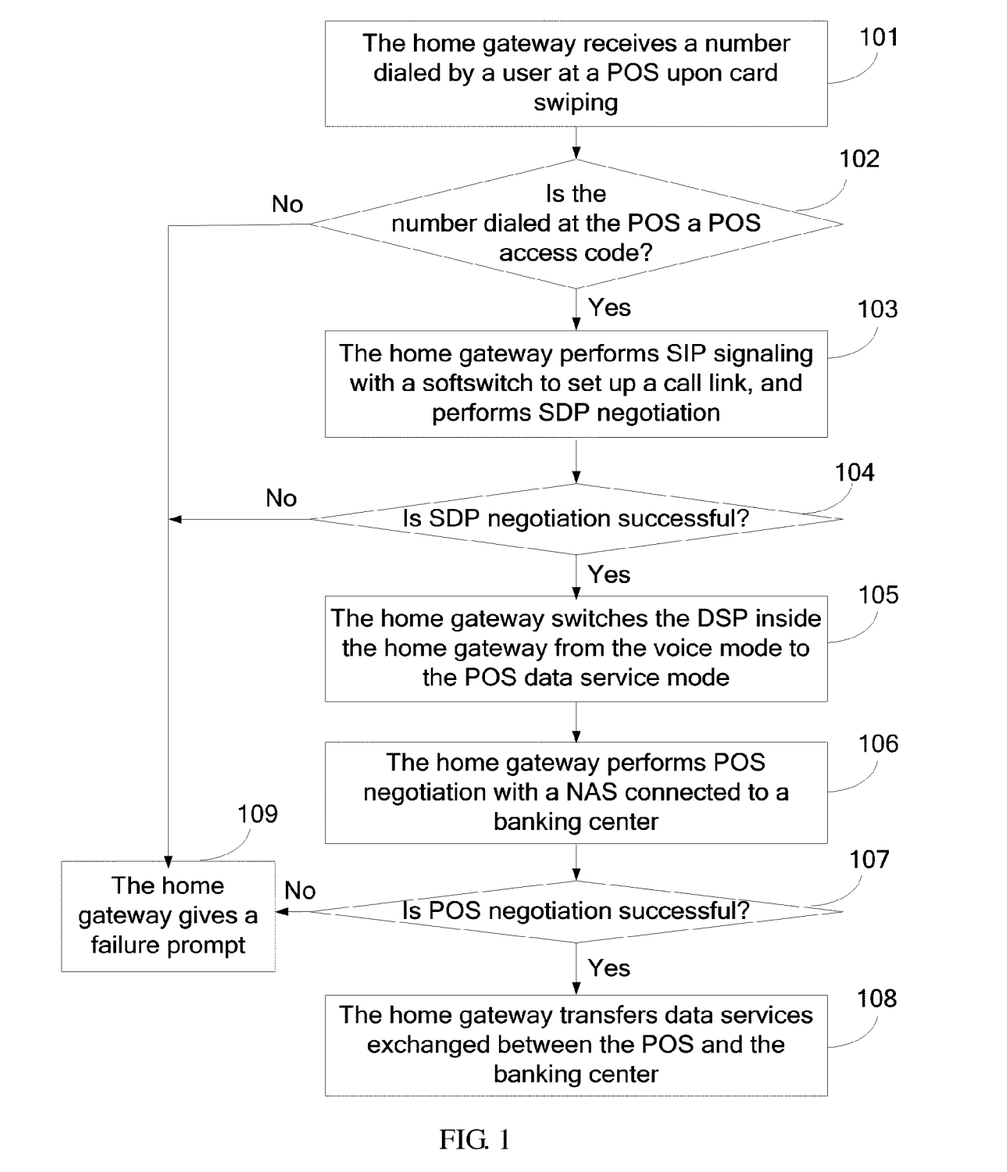
FIG. 1 is a flowchart of a method for carrying a POS data service over an IP network according to an embodiment of the present invention.

Taking payment through card swiping as an example, FIG. 1 illustrates a procedure of the method for carrying a POS data service over an IP network according to the embodiment of the present invention. The procedure includes the following steps.

Step 101: The home gateway receives a number dialed by a user at a POS upon swiping of a card.

Step 102: The home gateway judges whether the number dialed at the POS is a POS access code according to configuration information; and if the number dialed is a POS access code, step 103 is performed; if the number dialed is not a POS access code, step 109 is performed.

The configuration information is the configured POS access code. The configuration information may be configured on the home gateway manually or remotely. That is, the allowed POS access code is configured on a management server and then delivered to the home gateway through the Customer Premises Equipment (CPE) Wide Area Network (WAN) Management Protocol, or through a web page, which means the home gateway logs in to the web page through a browser and downloads the relevant configuration information.

For example, in practice, the configuration information may be delivered by an Access Control Server (ACS) to the home gateway over the TR-069 protocol. The TR-069 protocol is a technical specification developed by the Digital Subscriber Line (DSL) forum and its full name is CPE WAN Management Protocol. TR-069 provides a general framework and protocol for the management and configuration of home gateways in a next generation network. It is applicable to the remote centralized management of gateways, routers, and set top boxes in a home network on the network side.

The home gateway may judge whether the number dialed at the POS is a POS access code through matching. If the matching is successful, the number dialed at the POS is the POS access code.

Step 103: The home gateway performs SIP signaling with a softswitch to set up a call link, and performs SDP negotiation.

The home gateway initiates a call to the softswitch via SIP signaling and includes an X-pos field indicating negotiation of switching to the POS data service mode in an SDP message carried in the SIP signaling.

For example, the home gateway initiates a call to the softswitch via a SIP INVITE message. The SDP message in the INVITE message carries the Media Attribute "X-pos" and the Media Format "G711A/G711U/G729" which indicates the media coding format.

Step 104: The home gateway judges whether the SDP negotiation is successful; if the SDP negotiation is successful, step 105 is performed; if the SDP negotiation is unsuccessful, step 109 is performed.

For example, the softswitch returns a 200 OK message to the home gateway. If the SDP message of the 200 OK message carries the Media Attribute "X-pos" and such information as follows: "VAD: off, CNG: off; Media Format: G.711A or G711U", is carried, the SDP negotiation is successful.

Step 105: The home gateway switches the DSP inside the home gateway from the normal voice mode to the POS data service mode.

For example, the home gateway turns off the Voice Activity Detector (VAD) and the Comfort Noise Generator (CNG) and changes the jitter buffer from the dynamic adaptive mode to the static mode.

The jitter buffer in dynamic adaptive mode means a buffer of a certain size is arranged for the Real-time Transport Protocol (RTP) media receiver of the gateway and the RTP media packets are sorted and depacketized. This technique is designed for the purpose of avoiding impacts of network jitters on the voice signal. "Dynamic" means the buffer is not started when there is no network jitter and the depth of buffering is increased when the jitter is greater. Buffering, however, definitely increases the delay of transmission in the network. Therefore, changing the jitter buffer from the dynamic adaptive mode to the static mode will facilitate POS negotiation, training, and learning and reduce the network delay.

Step 106: The home gateway performs POS negotiation with a NAS of the banking center.

The tone sent by the POS is transferred to the home gateway via an analog signal over a telephone line; the home gateway modulates the tone into a digital signal which is encoded by the DSP and encapsulated into RTP packets; the RTP packets are then sent to the IP network. In the opposite way, the gateway receives RTP packets from the IP network; the RTP packets received by the gateway are decoded by the DSP and demodulated into an analog signal; the analog signal is transferred to the POS over the telephone line. POS negotiation covers the following information: modulation/demodulation protocol (V8, V21, V22, V25, V34, V90, V90 . . . ), uplink and downlink rates, compression protocol, and error correction protocol. In the process, the negotiation contents are transparently transmitted by the home gateway.

Step 107: The home gateway judges whether the POS negotiation is successful; if the POS negotiation is successful, step 108 is performed; the POS negotiation is unsuccessful, step 109 is performed.

If the POS dialing is successful, the negotiation between the POS and the NAS is successful. Then, the account, password, and amount information of the payment through card swiping can be sent up to the banking center via the negotiated link.

Step 108: The home gateway transfers data services exchanged between the POS and the banking center.

Step 109: The home gateway gives a failure prompt.

In the embodiment of the present invention, when a card is swiped at the POS, the home gateway receives a number reported by the POS, and once determining that the number reported by the POS is a POS access code, switches its DSP to the POS data service mode. Thus, the DSP of the home gateway no longer needs to switch its service mode according to an unreliable answer tone from the remote end, but quickly and accurately switches to the POS data service mode. This facilitates POS negotiation, training, and learning, and assures a prompt and reliable connection between the POS and the remote banking center, so that the success rate of card swiping is increased.

Figure 2:
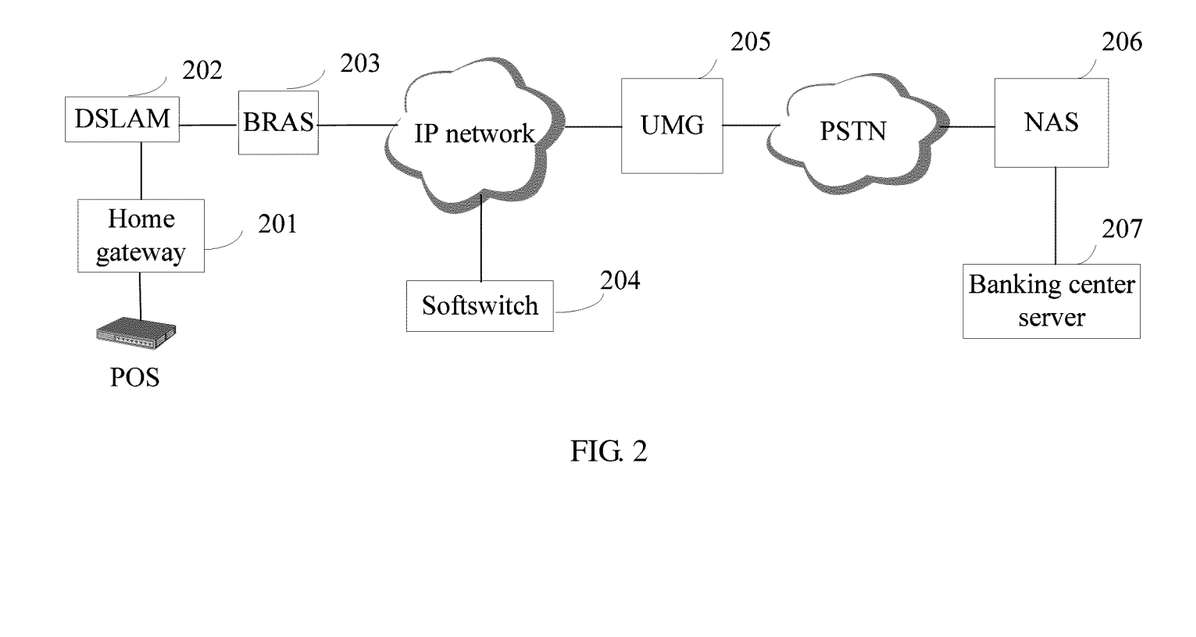
FIG. 2 illustrates a network structure where a POS is applied under an IP network.

FIG. 2 illustrates a networking structure where a POS is applied under an IP network.

The POS is connected to the IP network via a home gateway 201, a Digital Subscriber Line Access Multiplexer (DSLAM) 202, and a Broadband Remote Access Server (BRAS) 203. A softswitch 204 is connected to the IP network and configured to separate call control from the media gateway (transport layer) and implement the basic call control function, including connection control, translation and routing, gateway management, call control, bandwidth management, signaling, security, and call detail record (CDR). A banking center server 207 is connected to a Public Switched Telephone Network (PSTN) via a NAS 206. The IP network and the PSTN network are connected via a UMG 205. The UMG 205 implements change of a service bearer, interworking, and service traffic format processing. Analog signals are transferred between the UMG 205 and the NAS 206, and packet data is transferred between the UMG 205 and the softswitch 204 or the POS.

To help understand the differences between the technical solutions of the present invention and conventional arts, the procedures of payment through POS under an IP network according to the technical solutions of a conventional art and the present invention will be described respectively based on the above networking structure.

Figure 3:
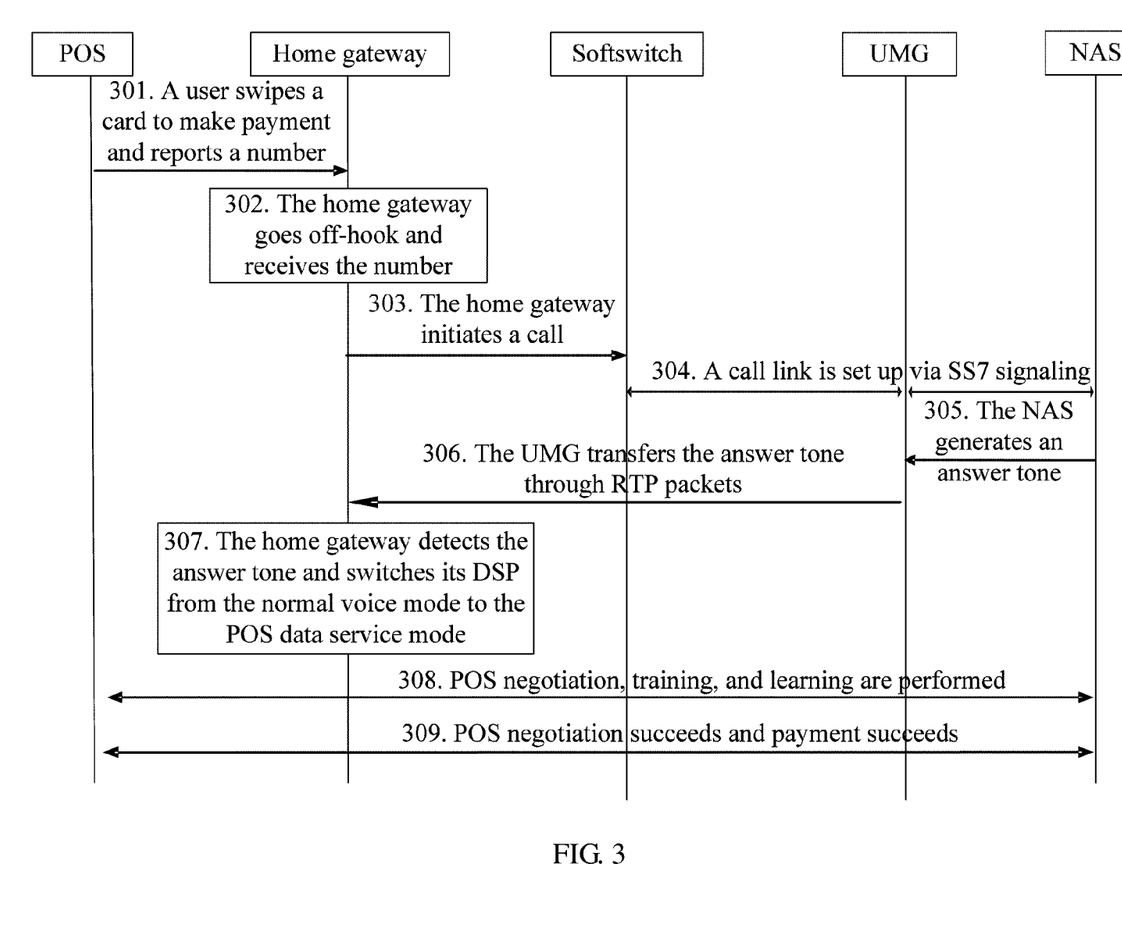
FIG. 3 is a message flow between all entities in the conventional art under the network structure shown in FIG. 2.

FIG. 3 is a message flow for payment through POS under an IP network in the conventional art, including the following steps.

301. A user swipes a card at the POS to make payment and the POS reports the dialed number to the home gateway.

302. The home gateway goes off-hook and receives the dialed number.

303. The home gateway initiates a call to the softswitch via SIP signaling, where the call is a normal voice call.

304. After a normal voice call is set up between the home gateway and the softswitch, a call link is set up between the softswitch, the UMG, and the NAS via Signaling System No. 7 (SS7) signaling.

305. The NAS generates a 2100 Hz answer tone.

306. The UMG receives the answer tone and sends the answer tone to the home gateway via RTP packets.

307. The home gateway detects the answer tone and switches its DSP from the normal voice mode to the POS data service mode.

Generally, the answer tone is encoded and decoded according to the G.729 standard, which provides lossy compression. The answer tone received by the home gateway from the remote end through RTP packets is the result of sampling, quantizing, encoding, and filtering the original 2100 Hz analog voice signal. In addition, due to the delay, jitter, and packet loss in the IP network, the answer tone from the remote end will be distorted and the demodulated signal will also be distorted, so that the answer tone processed by the DSP of the home gateway is a great distortion of the original analog answer tone. As a result, an error may occur in DSP detection and further, the DSP may fail to switch to the POS data service mode. Therefore, the success of payment through card swiping is not assured.

307. POS negotiation, training and learning are performed between the POS and the home gateway (analog signal), between the home gateway and the UMG (RTP packet), and between the UMG and the NAS (analog signal).

308. After successful POS negotiation, the POS exchanges information with the remote banking center and the payment is successful.

In the above procedure, because the DSP of the UMG is not switched to the POS data service mode, the processing of POS negotiation at the DSP of the UMG is not good. As a result, the success rate of POS negotiation, training, and learning is lower, which means the success rate of POS dialing will be lower.

Figure 4:
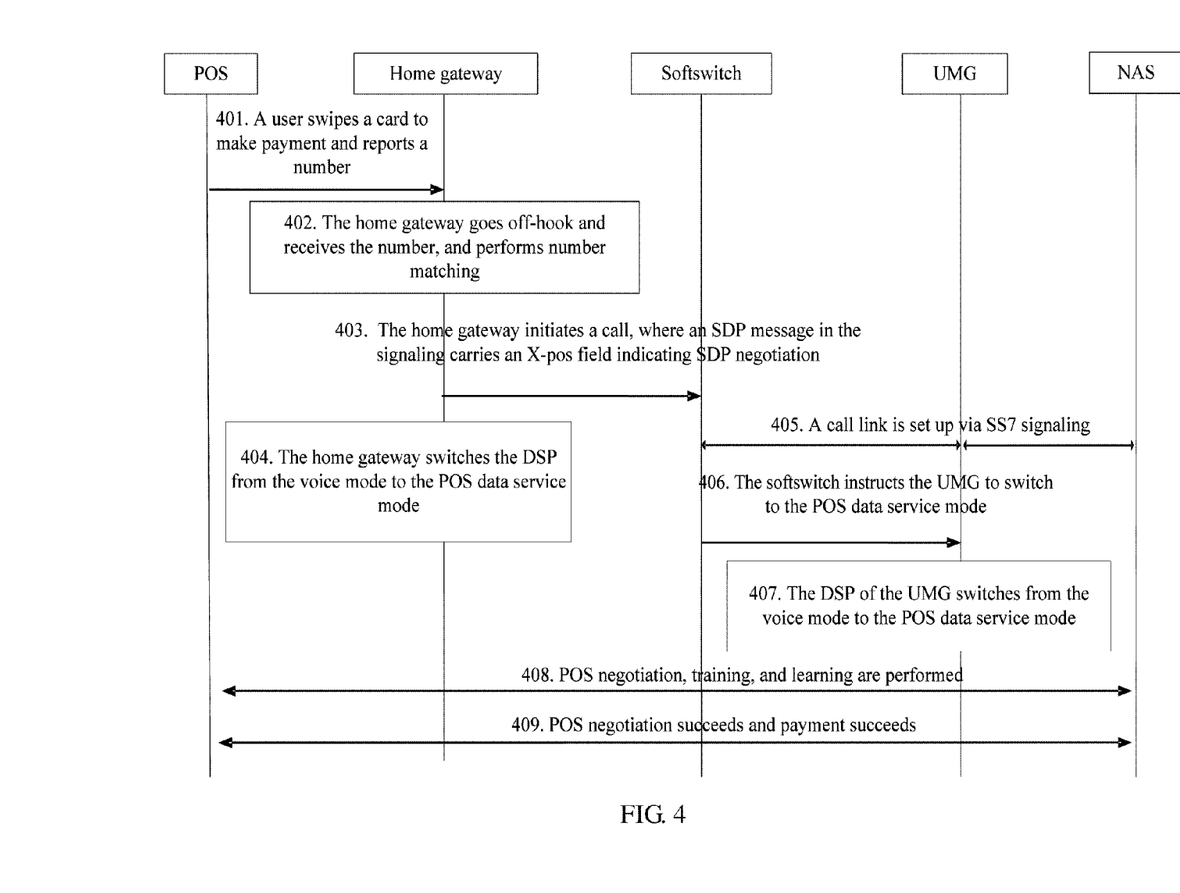
FIG. 4 is a message flow between all entities in an embodiment of the present invention under the network structure shown in FIG. 2.

FIG. 4 is a message flow for payment through POS under an IP network according to an embodiment in the present invention, including the following steps.

401. A user swipes a card at the POS to make payment and the POS reports the dialed number to the home gateway.

402. The home gateway goes off-hook and receives the number, and performs number matching according to the configured POS access code to judge whether the number is the POS access code.

403. If the number is the POS access code, the home gateway initiates a call to the softswitch and the SDP message carries an X-pos field indicating SDP negotiation with the softswitch. This means what is negotiated is not the normal voice mode but switching to the POS data service mode.

404. The home gateway switches the DSP inside the home gateway from the normal voice mode to the POS data service mode after successful SDP negotiation.

The difference between the normal voice mode and the POS data service mode is: in POS data service mode, the DSP turns off the VAD and CNG and changes the mode of the jitter buffer from the dynamic adaptive mode to the static mode.

Different from the conventional art where the DSP mode is changed through detection of the answer tone carried in RTP packets from the UMG, the solution of the present invention is faster and more reliable.

405. A call link is set up between the softswitch, the UMG, and the NAS via SS7 signaling and POS service is transferred on the call link.

406. The softswitch instructs the UMG to switch to the POS data service mode.

The softswitch and the UMG may interact through various protocols, for example, the H.248 protocol or a private protocol.

407. The DSP of the UMG switches from the normal voice mode to the POS data service mode. That is, the DSP changes the jitter buffer from the adaptive mode to the static mode and turns off the VAD and the CNG.

408. POS negotiation, training and learning are performed between the POS and the home gateway, between the home gateway and the UMG, and between the UMG and the NAS.

409. After successful POS negotiation, the POS exchanges information with the remote banking center and the payment is successful.

It should be noted that step 404 executed by the home gateway and step 405 and step 406 executed by the softswitch are simultaneous, and thereby, the processing speed is increased to a large extent. As a result, the progress of the procedure is faster and a connection between the POS and the remote banking center can be set up quickly to enable fast payment through card swiping.

From a comparison between the processes shown in FIG. 3 and FIG. 4, it is clear that, in the method provided in the embodiment of the present invention, every time a card is swiped at the POS, after the home gateway receives the number reported by the POS, the home gateway performs number matching, and once determining that the number reported is the POS access code, the home gateway performs SDP negotiation with the softswitch, and after successful negotiation, the DSP of the home gateway will be switched to the POS data service mode immediately. The DSP of the gateway no longer needs to switch its mode according to an unreliable answer tone from the remote end, but quickly and accurately switches to the POS data service mode, for the purpose of facilitating POS negotiation, training, and learning, assuring a prompt connection between the POS and the remote banking center, and guaranteeing fast and reliable payment through card swiping.

It should be noted that, in step 404, the DSP of the home gateway switches from the normal voice mode to the POS data service mode after successful SDP negotiation, but the present invention is not limited to such switching. The DSP of the home gateway may be switched from the normal voice mode to the POS data service mode in the process when the connection is set up, or after the connection is set up and before successful negotiation.

Further, after successful SDP negotiation between the home gateway and the softswitch, the softswitch immediately instructs the UMG to switch to the POS data service mode. Later, when POS negotiation and training are performed, the processing of a voice signal passing through the UMG by the DSP of the UMG will be better, so that the success rate of POS negotiation and training will be further increased to guarantee fast and reliable payment through card swiping.

Those skilled in the art understand that all or a part of the steps in the method provided by the foregoing embodiments of the present invention can be implemented by hardware under the instruction of a program. The program can be stored in a computer readable storage medium, such as a Read Only Memory (ROM), a Random Access Memory (RAM), a magnetic disk, and a Compact Disk-Read Only Memory (CD-ROM).

The embodiments of the present invention also provide a home gateway and a softswitch.

Figure 5:
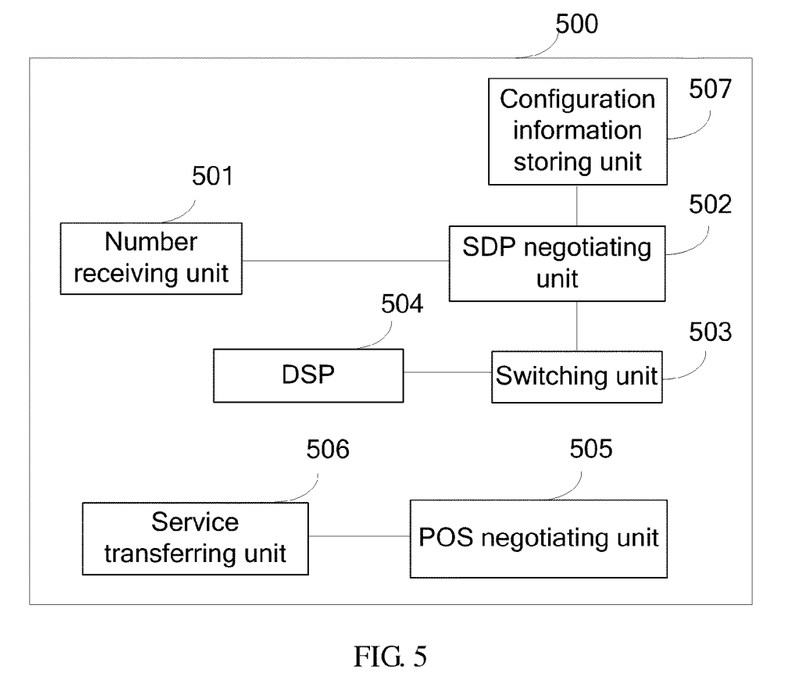
FIG. 5 illustrates a structure of a home gateway according to an embodiment of the present invention.

FIG. 5 illustrates the structure of a home gateway according to an embodiment of the present invention.

The home gateway 500 includes: a number receiving unit 501, an SDP negotiating unit 502, a switching unit 503, a DSP 504, a POS negotiating unit 505, and a service transferring unit 506, and may further include a configuration information storing unit 507.

The DSP 504 is configured to provide media related encoding and decoding capabilities (G711A, G711U, G729, . . . ), and VAD, CNG, and jitter buffer functions.

The number receiving unit 501 is configured to receive a number dialed at a POS upon card swiping for payment or other user operations.

The SDP negotiating unit 502 is configured to set up a call link with a softswitch through SIP signaling interactions when the number dialed at the POS is determined to be a POS access code according to configuration information, and perform SDP negotiation. The configuration information may be the POS access code and delivered to the home gateway by a remote server or manually configured on the home gateway.

The switching unit 503 is configured to switch the DSP 504 from the normal voice mode to the POS data service mode after successful negotiation of the SDP negotiating unit 502.

The POS negotiating unit 505 is configured to perform POS negotiation with a NAS connected to a banking center.

The service transferring unit 506 is configured to transfer the data services exchanged between the POS and the banking center after successful POS negotiation of the POS negotiating unit 505.

The configuration information storing unit 507 is configured to store the configuration information delivered by a management server over the CPE WAN Management Protocol, or store the configuration information delivered by the management server through a web page.

In practice, the SDP negotiating unit 502 may include a negotiation starting subunit and a negotiation processing subunit. The negotiation starting subunit is configured to initiate a call to the softswitch via SIP signaling and includes an X-pos field indicating negotiation of switching to the POS data service mode in an SDP message carried in the SIP signaling. The negotiation processing subunit is configured to exchange SDP negotiation information with the softswitch.

The home gateway provided in the embodiment of the present invention performs number matching after receiving a number reported by the POS, and once determining that the number is the POS access code, the home gateway performs SDP negotiation with the softswitch, and after successful negotiation, the DSP of the home gateway will be switched to the POS data service mode immediately. The DSP of the gateway no longer needs to switch its mode according to an unreliable answer tone from the remote end, but quickly and accurately switches to the POS data service mode, for the purpose of facilitating POS negotiation, training, and learning, assuring a prompt connection between the POS and the remote banking center, and guaranteeing fast and reliable payment through card swiping.

Figure 6:
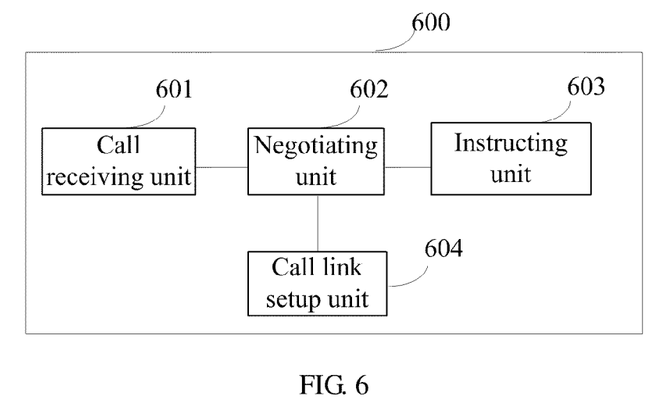
FIG. 6 illustrates a structure of a softswitch according to an embodiment of the present invention.

FIG. 6 illustrates the structure of a softswitch according to an embodiment of the present invention.

The softswitch 600 includes: a call receiving unit 601, a negotiating unit 602, and an instructing unit 603, and may further include a call link setup unit 604.

The call receiving unit 601 is configured to receive a call initiated by a home gateway via SIP signaling, an SDP message of which carries an X-pos field indicating negotiation of switching to the POS data service mode. The negotiating unit 602 is configured to perform SDP negotiation with the home gateway according to the X-pos field. The instructing unit 603 is configured to instruct the home gateway and the UMG to switch to the POS data service mode. Specifically, the instructing unit 603 may instruct the home gateway to switch to the POS data service mode after successful SDP negotiation, or instruct the home gateway to switch to the POS data service mode when the connection is set up, or after the connection is set up and before successful negotiation. The call link setup unit 604 is configured to set up a call link between the UMG and the NAS after the softswitch receives the call control signaling of the home gateway.

The softswitch provided in the embodiment of the present invention instructs the UMG to switch to the POS data service mode immediately after successful SDP negotiation with the home gateway. Later, when POS negotiation and training are performed, the processing of a voice signal passing through the UMG by the DSP of the UMG will be better, so that the success rate of POS negotiation and training will be further increased to guarantee fast and reliable payment through card swiping.

Figure 7:
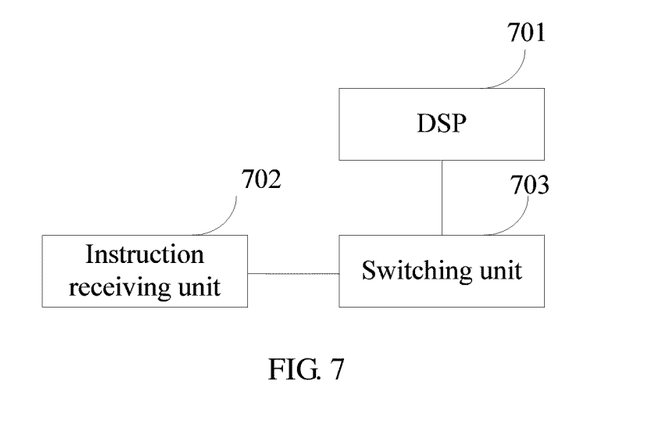
FIG. 7 illustrates a structure of a UMG according to an embodiment of the present invention.

An embodiment of the present invention provides a UMG. A structure of the UMG is illustrated in FIG. 7.

The UMG includes: a DSP 701, an instruction receiving unit 702, and a switching unit 703. The DSP 701 is configured to provide media related coding and decoding capabilities (G711A, G711U, G729, . . . ), and VAD, CNG, and jitter buffer functions. The instruction receiving unit 702 is configured to receive an instruction of switching to the POS data service mode from a softswitch. The switching unit 703 is configured to switch the DPS 701 from the normal voice mode to the POS data service mode according to the instruction received by the instruction receiving unit 702.

The UMG provided in the embodiment of the present invention switches its DSP from the normal voice mode to the POS data service mode according to the instruction of the softswitch before POS negotiation. Thus, when POS negotiation and training are performed later, the processing of a voice signal passing through the UMG by the DSP will be better, so as to further increase the success rate of POS negotiation and training and assure fast and reliable payment through card swiping.

Figure 8:
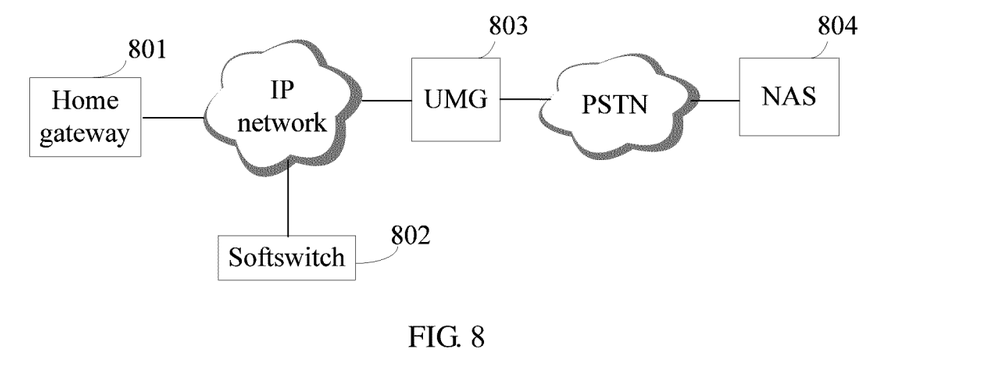
FIG. 8 illustrates a structure of a system for carrying a POS data service over an IP network according to an embodiment of the present invention.

An embodiment of the present invention provides a system for carrying a POS data service over an IP network. A structure of the system is illustrated in FIG. 8.

The system includes a home gateway 801, a softswitch 802, a UMG 803, and a NAS 804 connected to a banking center. The home gateway 801 and the softswitch 802 are connected to the UMG 803 through an IP network. The NAS 804 is connected to the UMG 803 through a PSTN.

The home gateway 801 is configured to: receive a number dialed at a POS upon card swiping for payment or other user operations, set up a call link with the softswitch through SIP signaling interactions and perform SDP negotiation when determining that the number dialed at the POS is a POS access code according to configuration information, and after successful negotiation, switch its DSP from the normal voice mode to the POS data service mode; and configured to perform POS negotiation with the NAS, and after successful negotiation, transfer data services exchanged between the POS and the banking center via the UMG and the NAS.

Specifically, the softswitch may instruct the home gateway to switch to the POS data service mode after success SDP negotiation, or instruct the home gateway to switch to the POS data service mode when the connection is set up, or after the connection is set up and before successful negotiation.

The softswitch 802 is configured to perform SDP negotiation with the home gateway and instruct the UMG to switch to the POS data service mode after successful negotiation.

The UMG 803 is configured to switch its DSP from the normal voice mode to the POS data service mode according to the instruction of the softswitch.

In practice, the specific structures of the home gateway 801 and the softswitch 802 may be the structures illustrated in FIG. 5 and FIG. 6.

With the system for carrying a POS data service over an IP network according to the embodiment of the present invention, payment through card swiping at a POS can be quickly and reliably implemented. The procedures are described in the embodiments of the method of the present invention and will not be further described here.

Although the purpose, technical solution and benefits of the present invention have been described in detail through exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the protection scope defined by the claims or their equivalents.

What is claimed is:

1. A method for carrying a Point of Sale (POS) data service over an Internet Protocol (IP) network, the method comprising:

receiving, by a home gateway, a number dialed by a user at a POS;

when determining that the number dialed at the POS is a POS access code according to configuration information, setting up a call link with a softswitch through Session Initiation Protocol (SIP) signaling interactions and performing Session Description Protocol (SDP) negotiation with the softswitch to negotiate an operation of switching to a POS data service mode;

switching a Digital Signal Processor (DSP) inside the home gateway from a normal voice mode to the POS data service mode according to receiving an instruction sent from the softswitch and after successful SDP negotiation between the home gateway and the softswitch; and performing POS negotiation with a Network Access Server (NAS) connected to a banking center and transferring data services exchanged between the POS and the banking center after successful negotiation.

2. The method according to claim 1, wherein the configuration information is a POS access code configured on the home gateway and wherein determining that the number dialed at the POS is the POS access code comprises determining the number dialed at the POS is the POS access code if the number dialed at the POS is successfully matched with the POS access code configured on the home gateway.

3. The method according to claim 2, wherein the configuration information is delivered by a management server to the home gateway through a Customer Premises Equipment (CPE) Wide Area Network (WAN) Management Protocol.

4. The method according to claim 2, wherein the configuration information is delivered by a management server to the home gateway through a web page.

5. The method according to claim 1, wherein performing SDP negotiation with the softswitch comprises:
   initiating, by the home gateway, a call to the softswitch via SIP signaling, including an X-pos field indicating negotiation of switching to the POS data service mode in an SDP message carried in the SIP signaling, so that the softswitch performs SDP negotiation with the home gateway according to the X-pos field after receiving the call.

6. The method according to claim 5, further comprising:
   setting up, by the softswitch, a call link with the NAS via a Universal Media Gateway (UMG) after successful SDP negotiation between the home gateway and the softswitch;
   instructing, by the softswitch, the UMG to switch to the POS data service mode; and
   switching, by the UMG, a DSP inside the UMG from the normal voice mode to the POS data service mode after receiving the instruction.

7. A home gateway, comprising:
   a Digital Signal Processor (DSP);
   a number receiving unit, configured to receive a number dialed by a user at a Point of Sale (POS);
   a Session Description Protocol (SDP) negotiating unit, configured to set up a call link with a softswitch through Session Initiation Protocol (SIP) signaling interactions when determining that the number dialed at the POS is a POS access code according to configuration information and perform SDP negotiation with the softswitch to negotiate an operation of switching to a POS data service mode;
   a switching unit, configured to switch the DSP from a normal voice mode to the POS data service mode according to receiving an instruction sent from the softswitch and after successful SDP negotiation between the SDP negotiating unit and the softswitch;
   a POS negotiating unit, configured to perform POS negotiation with a Network Access Server (NAS) that is connected to a banking center; and
   a service transferring unit, configured to transfer data services exchanged between the POS and the banking center after successful POS negotiation of the POS negotiating unit.

8. The home gateway according to claim 7, further comprising:
   a configuration information storing unit, configured to store configuration information delivered by a management server through a Customer Premises Equipment (CPE) Wide Area Network (WAN) Management Protocol.

9. The home gateway according to claim 7, further comprising:
   a configuration information storing unit, configured to or store configuration information delivered by a management server through a web page.

10. The home gateway according to claim 7, wherein the SDP negotiating unit comprises:
    a negotiation starting subunit, configured to initiate a call to the softswitch via SIP signaling and include an X-pos field indicating negotiation of switching to the POS data service mode in an SDP message in the SIP signaling; and
    a negotiation processing subunit, configured to exchange SDP negotiation information with the softswitch.

11. A softswitch, comprising:
    a call receiving unit, configured to receive a call initiated by a home gateway via Session Initiation Protocol (SIP) signaling, wherein a Session Description Protocol (SDP) message of the SIP signaling carries an X-pos field indicating negotiation of switching to a Point of Sale (POS) data service mode;
    a negotiating unit, configured to perform SDP negotiation with the home gateway according to the X-pos field; and
    an instructing unit, configured to instruct the home gateway and a Universal Media Gateway (UMG) to switch to the POS data service mode after successful SDP negotiation between the negotiating unit and the home gateway.

12. The softswitch according to claim 11, further comprising:
    a call link setup unit, configured to set up a call link between the UMG and a Network Access Server (NAS) after the softswitch receives call control signaling from the home gateway.

13. A system for carrying a Point of Sale (POS) data service over an Internet Protocol (IP) network, comprising:
    a home gateway;
    a softswitch communicatively coupled to the home gateway;
    a Universal Media Gateway (UMG) communicatively coupled to the softswitch; and
    a Network Access Server (NAS) communicatively coupled to the UMG, wherein the NAS is connected to a banking center;
    wherein the home gateway is configured to receive a number dialed by a user at a POS, set up a call link with the softswitch through Session Initiation Protocol (SIP) signaling interactions and perform Session Description Protocol (SDP) negotiation with the softswitch to negotiate an operation of switching to a POS data service mode when determining that the number dialed at the POS is a POS access code according to configuration information, and switch its Digital Signal Processor (DSP) from a normal voice mode to the POS data service mode according to receiving an instruction sent from the softswitch and after successful SDP negotiation between the home gateway and the softswitch; and is configured to perform POS negotiation with the NAS and after successful negotiation, transfer data services exchanged between the POS and the banking center via the UMG and the NAS.

14. The system according to claim 13, wherein the home gateway comprises:
    a Digital Signal Processor (DSP);
    a number receiving unit, configured to receive a number dialed by a user at a Point of Sale (POS);
    a Session Description Protocol (SDP) negotiating unit, configured to set up a call link with a softswitch through Session Initiation Protocol (SIP) signaling interactions when determining that the number dialed at the POS is a POS access code according to configuration information and perform SDP negotiation with the softswitch to negotiate an operation of switching to a POS data service mode;
    a switching unit, configured to switch the DSP from a normal voice mode to the POS data service mode;
    a POS negotiating unit, configured to perform POS negotiation with a Network Access Server (NAS) that is connected to a banking center; and a service transferring unit, configured to transfer data services exchanged between the POS and the banking center after successful POS negotiation of the POS negotiating unit.

15. The system according to claim 13, wherein the home gateway further comprises:
 a configuration information storing unit, configured to store configuration information delivered by a management server through a Customer Premises Equipment (CPE) Wide Area Network (WAN) Management Protocol, or to store configuration information delivered by the management server through a web page.

16. The system according to claim 13, wherein the SDP negotiating unit comprises:
 a negotiation starting subunit, configured to initiate a call to the softswitch via SIP signaling and include an X-pos field indicating negotiation of switching to the POS data service mode in an SDP message in the SIP signaling; and
 a negotiation processing subunit, configured to exchange SDP negotiation information with the softswitch.

17. The system according to claim 13, wherein the softswitch comprises:
 a call receiving unit, configured to receive a call initiated by a home gateway via Session Initiation Protocol (SIP) signaling, wherein a Session Description Protocol (SDP) message of the SIP signaling carries an X-pos field indicating negotiation of switching to a Point of Sale (POS) data service mode;
 a negotiating unit, configured to perform SDP negotiation with the home gateway according to the X-pos field; and
 an instructing unit, configured to instruct the home gateway and a Universal Media Gateway (UMG) to switch to the POS data service mode.

18. The system according to claim 13, wherein the softswitch further comprises:
 a call link setup unit, configured to set up a call link between the UMG and a Network Access Server (NAS) after the softswitch receives call control signaling from the home gateway.

* * * * *